United States Patent
Shiver et al.

(10) Patent No.: US 11,368,585 B1
(45) Date of Patent: Jun. 21, 2022

(54) SECURED SWITCH FOR THREE-WAY COMMUNICATIONS

(71) Applicant: International Business Machines Corporation, Armonk, NY (US)

(72) Inventors: Brent Shiver, Austin, TX (US); Ali Ishaq Unwala, Pflugerville, TX (US); Shunguo Yan, Austin, TX (US); Thomas Andrew Brunet, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/209,281

(22) Filed: Mar. 23, 2021

(51) Int. Cl.
*H04M 3/51* (2006.01)
*G10L 13/08* (2013.01)
(Continued)

(52) U.S. Cl.
CPC ............. *H04M 3/51* (2013.01); *G10L 13/08* (2013.01); *H04M 3/56* (2013.01); *H04N 7/15* (2013.01);
(Continued)

(58) Field of Classification Search
CPC combination set(s) only.
See application file for complete search history.

(56) References Cited

U.S. PATENT DOCUMENTS

| | | |
|---|---|---|
| 7,003,082 B2 | 2/2006 | Engelke |
| 7,236,574 B2 | 6/2007 | Haldeman |

(Continued)

FOREIGN PATENT DOCUMENTS

| | | | | |
|---|---|---|---|---|
| NL | 1475755 | * | 9/2003 | ............ G07C 15/00 |
| WO | 02100084 A1 | | 12/2002 | |

OTHER PUBLICATIONS

Authors et. al.: Disclosed Anonymously, "Confidential Information privacy using a Cognitive System," An IP.com Prior Art Database Technical Disclosure, IP.com No. IPCOM000252890D, IP.com Electronic Publication Date: Feb. 20, 2018, 4 pages.

(Continued)

*Primary Examiner* — Phung-Hoang J Nguyen
(74) *Attorney, Agent, or Firm* — Stephen R. Yoder; William H. Hartwell; Aaron N. Pontikos (57) ABSTRACT

A tool for providing a secure communication channel during three-way communications. The tool initiates a three-way communication from a user device, wherein the three-way communication is a connection between a user, a third-party interpreter, and a service provider. The tool enables a pass-through function of a secured switch for transmitting non-privileged data during the three-way communication. The tool determines whether privileged data is to be transmitted during the three-way communication. Responsive to a determination that privileged data is to be transmitted during the three-way communication, the tool mutes an audio communication component. The tool activates a bypass function of the secured switch for transmitting the privileged data on an alternate audio communication component. The tool transmits the privileged data directly from the user to the service provider through the alternate audio communication component, wherein the alternate audio communication component supports unidirectional text-to-speech (TTS) audio communication.

15 Claims, 3 Drawing Sheets

(51) Int. Cl.
  *H04M 3/56* (2006.01)
  *H04N 7/15* (2006.01)
(52) U.S. Cl.
  CPC ............... *H04M 2201/40* (2013.01); *H04M 2203/2061* (2013.01)

(56) References Cited

U.S. PATENT DOCUMENTS

| | | | |
|---|---|---|---|
| 10,122,968 B1 | 11/2018 | Talbot | |
| 10,127,833 B1 | 11/2018 | Utley | |
| 2006/0285652 A1* | 12/2006 | McClelland | H04M 3/42391 379/52 |
| 2009/0251338 A1* | 10/2009 | Marggraff | H04M 1/0285 382/187 |
| 2010/0082342 A1 | 4/2010 | Erhart | |
| 2012/0143596 A1* | 6/2012 | Bhogal | G06F 40/40 704/9 |
| 2013/0235994 A1* | 9/2013 | Hanson | H04M 3/4285 379/202.01 |
| 2017/0154230 A1* | 6/2017 | Dow | G06F 3/0484 |
| 2017/0201391 A1* | 7/2017 | Kammerer | H04L 65/1069 |
| 2018/0276395 A1* | 9/2018 | Bostick | G06F 21/604 |
| 2019/0036854 A1* | 1/2019 | Badge | H04L 51/046 |
| 2019/0052471 A1* | 2/2019 | Panattoni | G06F 3/0484 |

OTHER PUBLICATIONS

Behera et al., "Mute and Un-Mute Groups During Virtual Meetings", An IP.com Prior Art Database Technical Disclosure, IP.com No. IPCOM000249579D, IP.com Electronic Publication Date: Mar. 3, 2017, Copyright: Copyright 2017 Cisco Systems, Inc., 5 pages.

Klehr et al., "A Web based Speech Transcription Workplace", In INTERSPEECH 2011, 12th Annual Conference of the International Speech Communication Association, Florence, Italy, Aug. 28-31, 2011, pp. 3269-3272.

Nainar et al., "Policy and Metadata Controlled Meeting Granular Content Visibility and Access for Remote Participants", An IP.com Prior Art Database Technical Disclosure, IP.com No. IPCOM000253181D, IP.com Electronic Publication Date: Mar. 12, 2018, Copyright: Copyright 2018 Cisco Systems, Inc., 5 pages.

\* cited by examiner

SECURED SWITCH FOR THREE-WAY COMMUNICATIONS

BACKGROUND OF THE INVENTION

The present invention relates generally to electronic communications, and more particularly to securing sensitive information during three-way communications.

Videoconferencing is a mode of electronic communication capable of providing simultaneous video and audio connectivity for groups of people. This type of communication has become widely used in everyday communications. Videoconferencing is used in commercial and corporate settings to facilitate meetings and collaboration. Additionally, videoconferencing has proven useful in other applications as well, including sign language transmission for hearing-impaired and speech-impaired individuals, distance education, and telemedicine. In a use case for sign language transmission, videoconferencing for three-way communications may include a hearing-impaired user, a third-party interpreter, and a service provider, where the hearing-impaired user transmits a request in sign language to the third-party interpreter using video and audio connectivity, and the third-party interpreter relays the request to the service provider using audio connectivity.

SUMMARY

Aspects of an embodiment of the present invention disclose a method, computer program product, and computer system for providing a secure communication channel during three-way communications. The method includes initiating, by one or more computer processors, a three-way communication from a user device, wherein the three-way communication is a connection between a user, a third-party interpreter, and a service provider. The method includes enabling, by the one or more computer processors, a pass-through function of a secured switch for transmitting non-privileged data during the three-way communication. The method includes determining, by the one or more computer processors, whether privileged data is to be transmitted during the three-way communication. Responsive to a determination that privileged data is to be transmitted during the three-way communication, the method includes muting, by the one or more computer processors, an audio communication component. The method includes activating, by the one or more computer processors, a bypass function of the secured switch for transmitting the privileged data on an alternate audio communication component. The method includes transmitting, by the one or more computer processors, the privileged data directly from the user to the service provider through the alternate audio communication component, wherein the alternate audio communication component supports unidirectional text-to-speech (TTS) audio communication.

DETAILED DESCRIPTION

Embodiments of the present invention recognize that in a business case where a hearing-impaired user communicates with a service provider through a third-party interpreter on an audio channel, the hearing-impaired user is in a position where private information requested by the service provider must be shared with the third-party interpreter. Embodiments of the present invention further recognize that utilizing a third-party translation service, such as a sign language interpreter, subjects a user to a potential theft of sensitive personal information. Embodiments of the present invention further recognize that, despite standards policies requiring complete confidentiality between a user and a third-party interpreting service, there is no guarantee that an employee of the third-party interpreting service (i.e., an interpreter) will adhere to such requirements. Embodiments of the present invention further recognize that there is a need to protect a user of a third-party interpreting service from an interpreter that may seek to leverage sensitive personal information of the user for nefarious activities.

Embodiments of the present invention provide the capability to protect a hearing-impaired user from potential theft of sensitive personal information while communicating with a service provider through a third-party interpreting service. Embodiments of the present invention provide the capability for a hearing-impaired user to access video and audio-based support from a third-party interpreting service while retraining from exposing sensitive personal information to a non-privileged third-party interpreter. Embodiments of the present invention further provide the capability to maintain a standard means of communication between a user, a service provider, and a third-party interpreting service, while managing a flow of data from a user side of a three-way communication. Embodiments of the present invention provide the capability for a user, when transmitting sensitive personal information to a service provider, to bypass a third-party interpreter and share the sensitive personal information directly to the service provider utilizing a text-to-speech function. Embodiments of the present invention provide the capability to temporarily mute an audio channel between a user and a third-party interpreter and transmit sensitive personal information through a text-to-speech function directly to a service provide utilizing an audio channel, by muting parties that are not privy to private information.

Embodiments of the present invention provide an inventive approach that has advantages over other known solutions. While a user may be able to manage a similar process with individual components (e.g., standard video conference service, stand-alone text-to-speech device, and a phone), this requires both the user and a service provider to use the same conference software and services, which can be problematic and cost-prohibitive to the user where the user may have multiple service providers, with each requiring a different conferencing software. Similarly, a user may use existing stand-alone components to manually manage the workflow, for example, to manually mute a third-party interpreter. However, this can be error prone since an audio channel may not be turned off in time, causing private data to accidentally be exposed to the third-party interpreter while sharing with a service provider, as well as potentially mute information that should pass through the third-party interpreter to maintain efficiency in the three-way communication. The inventive approach discussed herein adds to an existing workflow, allowing a hearing-impaired user to utilize existing technologies and communication workflows that the hearing-impaired user is already familiar with, as the add-on can be a plugin to the existing workflow. Additionally, with the inventive approach, only private data is directly sent to a service provider, rather than the entirety of the data from a three-way communication, which maintains communication efficiency.

Implementation of such embodiments may take a variety of forms, and exemplary implementation details are discussed subsequently with reference to the Figures.

Figure 1:
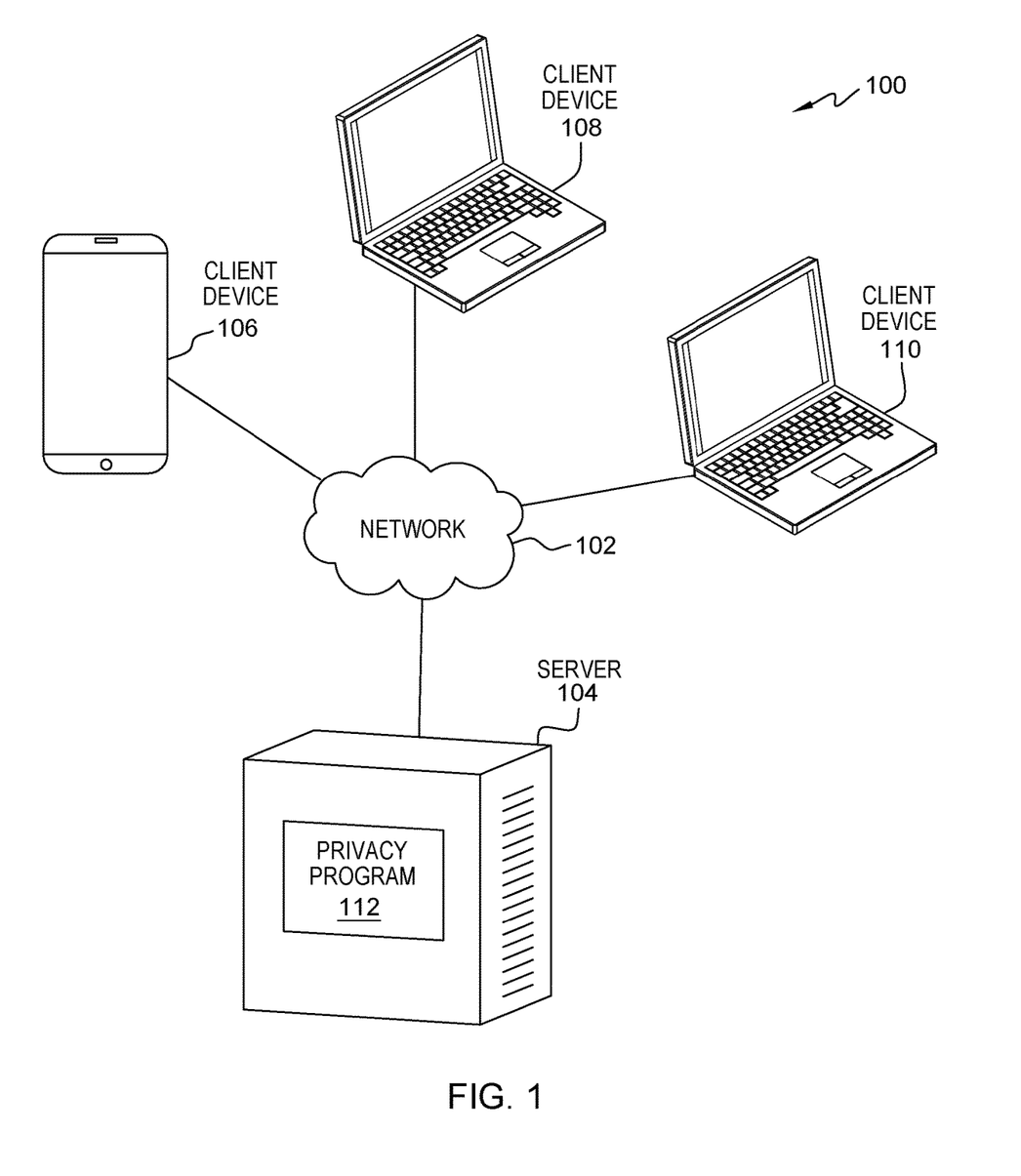
FIG. 1 illustrates a data processing environment, generally designated 100, in accordance with an embodiment of the present invention.

Referring now to various embodiments of the invention in more detail, FIG. 1 is a functional block diagram that illustrates a data processing environment, generally designated 100, suitable for providing a secure communication channel during three-way communications, in accordance with at least one embodiment of the invention. The present invention will now be described in detail with reference to the Figures. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims. FIG. 1 includes network 102, server 104, one or more client devices, such as client device 106, client device 108, and client device 110, and privacy program 112.

In one embodiment, network 102 is the Internet representing a worldwide collection of networks and gateways that use TCP/IP protocols to communicate with one another. Network 102 may include wire cables, wireless communication links, fiber optic cables, routers, switches and/or firewalls. Server 104, client device 106, client device 108, and client device 110 are interconnected by network 102. Network 102 can be any combination of connections and protocols capable of supporting communications between server 104, client device 106, client device 108, client device 110, and privacy program 112. Network 102 can be, for example, a telecommunications network, a local area network (LAN), a virtual local area network (VLAN), a wide area network (WAN), such as the Internet, or a combination of the three, and can include wired, wireless, or fiber optic connections. Network 102 may include one or more wired and/or wireless networks that are capable of receiving and transmitting data, voice, and/or video signals, including multimedia signals that include voice, data, and video information. In general, network 102 may be any combination of connections and protocols that will support communications between server 104, client device 106, client device 108, client device 110, and privacy program 112, as well as other computing devices (not shown) within data processing environment 100. FIG. 1 is intended as an example and not as an architectural limitation for the different embodiments.

In one embodiment, server 104 may be, for example, a server computer system such as a management server, a web server, or any other electronic device or computing system capable of sending and receiving data. In another embodiment, server 104 may be a data center, consisting of a collection of networks and servers providing an IT service, such as virtual servers and applications deployed on virtual servers, to an external party. In another embodiment, server 104 represents a "cloud" of computers interconnected by one or more networks, where server 104 is a computing system utilizing clustered computers and components to act as a single pool of seamless resources when accessed through network 102. This is a common implementation for data centers in addition to cloud computing applications. In one embodiment, server 104 includes privacy program 112 for providing a secure communication channel for transmitting sensitive personal information during three-way communications between a user, a third-party interpreter, and a service provider, such as illustrated by client device 106, client device 108, and client device 110, respectively.

In one embodiment, privacy program 112 operates on a central server, such as server 104, and can be utilized by one or more client devices, such as client device 106, client device 108, and client device 110, via an application download from the central server or a third-party application store and executed on the one or more client devices. In another embodiment, privacy program 112 may be software, downloaded from a central server, such as server 104, and installed on one or more client devices, such as client device 106, client device 108, and client device 110. In yet another embodiment, privacy program 112 may be utilized as a software service provided by a third-party cloud service provider (not shown). In yet another embodiment, privacy program 112 may include one or more components (not shown), such as add-ons, plug-ins, and agent programs, etc., installed on one or more client devices, such as client device 106, client device 108, and client device 110, to provide a secure communication channel during three-way communications. In one embodiment, privacy program 112 can be an add-on feature to a third-party interpreting service that provides a user the ability to enable a secure communication channel for transmitting sensitive personal information during three-way communications. In one embodiment, privacy program 112 can be fully integrated with a third-party interpreting service. In some embodiments, privacy program 112 may be partially integrated or separate from a third-party interpreting service. In one embodiment, privacy program 112 may be an application, downloaded from an application store or third-party provider, capable of being used in conjunction with a third-party interpreting service during a three-way communication between a user, an interpreter, and a service provider on one or more client devices, such as client device 106, client device 108, and client device 110, to provide a secure communication channel for transmitting sensitive personal information during three-way communications.

In one embodiment, privacy program 112 can be utilized by a client device, such as client device 106, client device 108, and client device 110, to enable a secure communication channel for transmitting sensitive personal information during three-way communications. In one embodiment, privacy program 112 provides the capability for a hearing-impaired user to communicate confidential data to a service provider without exposing the confidential data to a third-party interpreter. In one embodiment, privacy program 112 provides the capability for a hearing-impaired user to leverage a secured switch from a user side of a three-way communication workflow that automatically switches communication channels (e.g., audio channel, alternate audio channel, video channel, etc.) for standard data (e.g., general data) and confidential data (e.g., secure data, privileged data, sensitive personal information, etc.) to protect the privacy of the hearing-impaired user during a three-way communication between the hearing-impaired user, a third-party interpreter, and a service provider. In one embodiment, privacy program 112 provides the capability for a secured switch to function as a passthrough for standard data in a three-way communication workflow, where a user transmits the standard data to a service provider through a third-party interpreter on a bidirectional (i.e., two-way) audio channel. In one embodiment, privacy program 112 provides the capability for a secured switch to function as a bypass for confidential data in a three-way communication workflow, where a user enables a bypass function of the secured switch by typing out confidential data to be transmitted directly to a service provider on a unidirectional (i.e., one-way) alternate communication channel utilizing a text-to-speech function. In one embodiment, privacy program 112 automatically mutes a bidirectional audio channel with a third-party interpreter when a user begins typing out confidential data to be transmitted directly to a service provider on a unidirectional alternate communication channel utilizing a text-to-speech function.

In one embodiment, privacy program 112 may be configured to access various data sources, such as a database or repository (not shown), that may include personal data, content, contextual data, or information a user wishes not to be processed. Personal data includes personally identifying information or sensitive personal information as well as user information, such as tracking or geolocation information. Processing refers to any operation, automated or unautomated, or set of operations such as collecting, recording, organizing, structuring, storing, adapting, altering, retrieving, consulting, using, disclosing by transmission, dissemination, or otherwise making available, combining, restricting, erasing, or destroying personal data. Privacy program 112 enables the authorized and secure processing of personal data. In one embodiment, privacy program 112 provides informed consent, with notice of the collection of personal data, allowing the user to opt in or opt out of processing personal data. Consent can take several forms. Opt-in consent can impose on the user to take an affirmative action before personal data is processed. Alternatively, opt-out consent can impose on the user to take an affirmative action to prevent the processing of personal data before personal data is processed. In one embodiment, privacy program 112 provides information regarding personal data and the nature (e.g., type, scope, purpose, duration, etc.) of the processing. In one embodiment, privacy program 112 provides a user with copies of stored personal data. In one embodiment, privacy program 112 allows the correction or completion of incorrect or incomplete personal data. In one embodiment, privacy program 112 allows the immediate deletion of personal data.

In one embodiment, client device 106, client device 108, and client device 110 are clients to server 104 and may be, for example, a desktop computer, a laptop computer, a tablet computer, a personal digital assistant (PDA), a smart phone, a thin client, or any other electronic device or computing system capable of communicating with server 104 through network 102. For example, client device 106 may be a mobile device, such as a smart phone, capable of connecting to a network, such as network 102, to access the Internet, utilize an enabled two-factor authentication security system, and utilize one or more software applications. In another example, client device 108 and client device 110 may be a computing device utilized by a third-party interpreter and a service provider, respectively. In one embodiment, client device 106, client device 108, and client device 110 may be any suitable type of client device capable of executing one or more applications utilizing a mobile operating system or a computer operating system. In one embodiment, client device 106, client device 108, and client device 110 may include a user interface (not shown) for providing a user with the capability to interact with privacy program 112, a third-party interpreter via a client device, such as client device 108, and a service provider via a client device, such as client device 110. A user interface refers to the information (such as graphic, text, and sound) a program presents to a user and the control sequences the user employs to control the program. There are many types of user interfaces. In one embodiment, the user interface may be a graphical user interface (GUI). A GUI is a type of user interface that allows users to interact with electronic devices, such as a keyboard and mouse, through graphical icons and visual indicators, such as secondary notations, as opposed to text-based interfaces, typed command labels, or text navigation. In computers, GUIs were introduced in reaction to the perceived steep learning curve of command-line interfaces, which required commands to be typed on the keyboard. The actions in GUIs are often performed through direct manipulation of the graphics elements.

In one embodiment, client device 106, client device 108, and client device 110 may be any wearable electronic devices, including wearable electronic devices affixed to eyeglasses and sunglasses, helmets, wristwatches, clothing, wigs, tattoos, embedded devices, and the like, capable of sending, receiving, and processing data. In one embodiment, client device 106, client device 108, and client device 110 may be any wearable computer capable of supporting a secure three-way communication between a user, a third-party interpreter, and a service provider utilizing both audio and video communication channels. Wearable computers are miniature electronic devices that may be worn by the bearer under, with, or on top of clothing, as well as in or connected to glasses, hats, or other accessories. Wearable computers are especially useful for applications that require more complex computational support than merely hardware coded logics. In general, client device 106, client device 108, and client device 110 each represent one or more programmable electronic devices or combination of programmable electronic devices capable of executing machine readable program instructions and communicating with other computing devices (not shown) within data processing environment 100 via a network, such as network 102.

Figure 2:
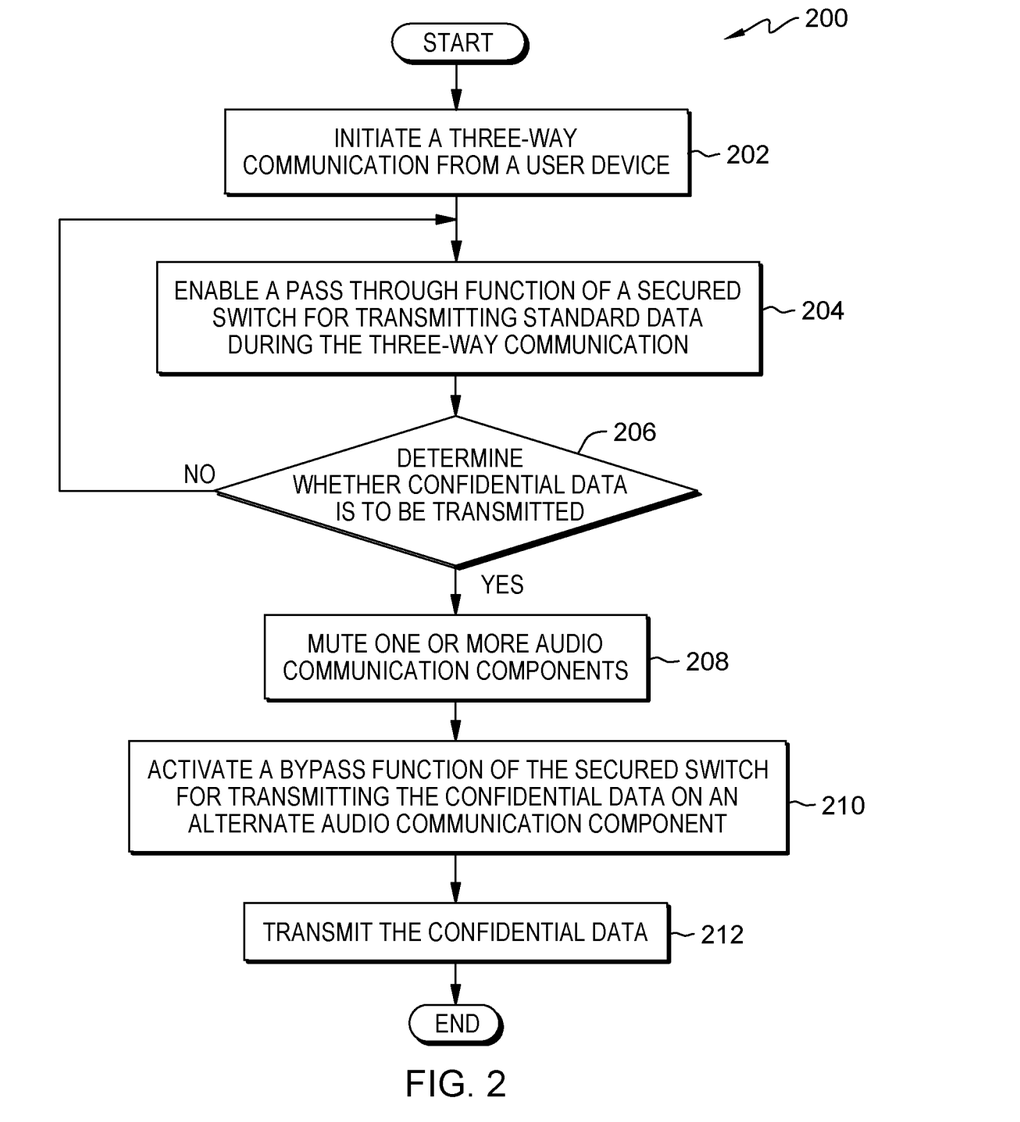
FIG. 2 is a flowchart depicting operational steps of a privacy program, such as the privacy program of FIG. 1, generally designated 200, for providing a secure communication channel during three-way communications, in accordance with an embodiment of the present invention.

FIG. 2 is a flowchart depicting operational steps of privacy program, such as privacy program 112, generally designated 200, for providing a secure communication channel for transmitting sensitive personal information during three-way communications, in accordance with an embodiment of the present invention.

Privacy program 112 initiates a three-way communication from a user device (202). In one embodiment, privacy program 112 initiates a three-way communication from a user device, where the three-way communication is a connection between a user, a third-party interpreter, and a service provider. In one embodiment, privacy program 112 initiates the three-way communication from the user device to the service provider through the third-party interpreter, where the three-way communication includes a video conference communication component supporting bidirectional audio and visual communication (e.g., audio/video communication channel) between the user and the third-party interpreter, at least one audio conference communication component supporting bidirectional audio communication between the third-party interpreter and the service provider (e.g., audio only/video disabled communication channel), and an alternate audio communication component supporting unidirectional text-to-speech (TTS) audio from the user directly to the service provider. In another embodiment, the three-way communication may include a video conference communication component supporting bidirectional audio and visual communication (e.g., audio/video communication channel) between the user, the third-party interpreter, and the service provider, and an alternate audio communication component supporting unidirectional audio communication between the user and the service provider, where audio communication between the third-party interpreter and the service provider intermediating for the user passes through the audio component of the video conference communication. In one embodiment, privacy program 112 configures the alternate audio communication component supporting unidirectional communication between the user and the service provider to include a text-to-speech (TTS) generator that provides the capability for the user to type confidential data into a user device, such as client device 106, and convert the typed confidential data into speech (i.e., audio data) to transmit directly to the service provider on the unidirectional alternate audio communication component independent of the third-party interpreter. In one embodiment, privacy program 112 configures the three-way communication to include a secured switch, where the secured switch is a user activated privacy switch functioning as a gateway for data transmitted from the user to the service provider, either through the third-party interpreter via the bidirectional audio and visual communication component, or to the service provider directly via the unidirectional alternate audio communication component. In one embodiment, the secured switch may be fully integrated, partially integrated, or separate from privacy program 112. In one embodiment, the secured switch may be a software switch, such as a plugin to a user device, such as client device 106, and may connect to an input device (e.g., GUI, keyboard, touchscreen, etc.) and a TTS generator. In one embodiment, the three-way communication and associated communication components (i.e., video communication component, audio communication component, and alternate audio communication component, etc.) can be provided by the user via a user device, such as client device 106, the third-party interpreter via a computing device, such as client device 108, the service provider via a computing device, such as client device 110, or a third-party communication application or communication service via one or more computing devices or servers (not shown).

For example, during an initial conversation, privacy program 112 enables a video conference communication component and an audio conference communication component to facilitate bidirectional audio and visual communication between the user and the third-party interpreter, as well as bidirectional audio communication between the user, the third-party interpreter, and the service provider. In this example of a three-way communication workflow, the third-party interpreter facilitates communication between the user and the service provider, such as where the third-party interpreter receives sign language from the user through the video conference communication component and translates the request into speech that is relayed to the service provider utilizing the audio conference communication component.

Privacy program 112 enables a passthrough function of a secured switch for transmitting standard data during the three-way communication (204). In one embodiment, privacy program 112 enables a passthrough function of a secured switch for the standard data (i.e., non-privileged data) transmitted between the user and the service provider through the third-party interpreter. In one embodiment, with the passthrough function of the secured switch enabled, the three-way communication follows the example workflow discussed above, with the third-party interpreter listening in on the conversation between the user and the service provider and utilizing sign language to convey information from both the service provider to the user, and the user to the service provider.

Privacy program 112 determines whether confidential data is to be transmitted (decision block 206). In one embodiment, privacy program 112 determines whether confidential data is to be transmitted by detecting a typing input (e.g., text generation) from the user device. In one embodiment, privacy program 112 may detect the typing input from a keyboard integrated with the user device, such as a keyboard of client device 106. For example, privacy program 112 may detect the typing input from a keystroke made on a wireless keyboard paired to the user device. In another embodiment, privacy program 112 may detect the typing input entered into a user interface integrated with the user device. For example, privacy program 112 may detect typing input when the user enters text into a dedicated field within a user interface on the user device. In yet another embodiment, privacy program 112 may detect the typing input from a touchscreen integrated with the user device. For example, privacy program 112 may detect typing input from a tactile touch stroke on a touchscreen displayed on the user device. In yet another embodiment, privacy program 112 may detect typing input from digital handwriting utilizing ocular character recognition (OCR). For example, privacy program 112 may detect typing input when the user writes out a word, a phrase, a sentence, or a series of numbers, on a screen or open-air digital handwriting using a smart device (e.g., smart pen, ring device, etc.) paired to the user device. In yet another embodiment, privacy program 112 may detect a typing input from any combination of a plurality of sources originating from or connected to the user device. In one embodiment, where privacy program 112 detects a typing input from the user device, privacy program 112 determines that confidential data (i.e., privileged data) is to be transmitted to the service provider. In one embodiment, where privacy program 112 does not detect a typing input from the user device, privacy program 112 determines that no confidential data is to be transmitted to the service provider. In yet another embodiment, privacy program 112 may monitor the conversation between a service provider and the user, and detect, by keywords or more sophisticated artificial intelligence technologies, that the user needs to provide confidential information, then prompt the user to type or passthrough.

Responsive to a determination that no confidential data is to be transmitted (decision block 206, NO branch), privacy program 112 continues to enable the passthrough function of the secured switch for transmitting standard data during the three-way communication (204).

Responsive to determination that confidential data is to be transmitted (decision block 206, YES branch), privacy program 112 mutes one or more audio communication components (208). In one embodiment, privacy program 112 mutes one or more audio communication components supporting bidirectional audio communication between the user and the third-party interpreter, as well as between the third-party interpreter and the service provider. In one embodiment, privacy program 112 mutes the one or more audio communication components by activating a smart mute function, where the smart mute function automatically mutes all audio communication components connecting the third-party interpreter to the three-way communication. In one embodiment, privacy program 112 activates the smart mute function immediately upon the determination that confidential data is being transferred (i.e., upon the detection of typing input from the user device). In one embodiment, privacy program 112 mutes the one or more audio communication components utilizing the smart mute function to effectively isolate the third-party interpreter from the three-way communication and preventing the third-party interpreter from hearing the confidential data being transmitted from the user to the service provider. In one embodiment, privacy program 112 utilizes the smart mute function to temporarily disable any audio communication channels connecting the third-party interpreter to the three-way communication, while leaving at least one alternate audio communication component active to facilitate private communication between the user and the service provider utilizing a text-to-speech generator. In one embodiment, privacy program 112 utilizes the smart mute function to eliminate a potential user error, such as a gap in time (e.g., buffering of audio) that may result from the user neglecting to mute the third-party interpreter prior to transmitting the confidential data, that could result in malicious acquisition of the confidential data. In one embodiment, privacy program 112 may unmute the one or more audio communication components connecting the third-party interpreter to the three-way communication upon detecting a pre-determined pause in typing input. In another embodiment, privacy program 112 may unmute the one or more audio communication components connecting the third-party interpreter to the three-way communication upon detecting a user-initiated override keystroke that indicates confidential data is not to be transmitted. In another embodiment, privacy program 112 may unmute the one or more audio communication components connecting the third-party interpreter to the three-way communication upon detecting a user stopped the typing and begins using sign language through video detection.

Privacy program 112 activates a bypass function of the secured switch for transmitting the confidential data on an alternate audio communication component (210). In one embodiment, privacy program 112 activates the bypass function of the secured switch concurrently with muting the one or more audio communication components that connect the third-party interpreter to the three-way communication. In one embodiment, activating the bypass function of the secured switch enables an alternate audio communication component between the user and the service provider. In one embodiment, the alternate audio communication component supports unidirectional text-to-speech (TTS) audio communication from the user directly to the service provider. In one embodiment, upon activating the bypass function of the secured switch, privacy program 112 directs the confidential data (i.e., the typing input) to a text-to-speech generator for conversion to voice data.

Privacy program 112 transmits the confidential data (212). In one embodiment, privacy program 112 transmits the confidential data (i.e., the typing input) directly from the user to the service provider through the alternate audio communication component. In one embodiment, prior to transmitting the confidential data, privacy program 112 utilizes the activated bypass function of the secured switch to direct the confidential data to a text-to-speech generator. In one embodiment, privacy program 112 utilizes the text-to-speech generator to convert the confidential data into voice data for transmission to the service provider. In one embodiment, privacy program 112 transmits the voice data directly to the service provider on the alternate communication component supporting unidirectional text-to-speech (TTS) audio communication from the user directly to the service provider. In this way, the voice data (i.e., the confidential data) is conveyed to the service provider as spoken text without allowing the third-party interpreter access to the data. In one embodiment, upon completion of the transmission, privacy program 112 automatically deactivates the bypass function of the secured switch and reverts back to enabling the passthrough function of the secured switch for transmitting standard data (i.e., non-privileged data) for the remainder of the three-way communication, or until a second determination is made that confidential data is to be transmitted (see steps 204 and 206). In one embodiment, automatically deactivating the bypass function of the secured switch includes unmuting the one or more audio communication components that connect the third-party interpreter to the three-way communication, thus re-engaging the third-party interpreter in the three-way communication to maintain communication efficiency.

Figure 3:
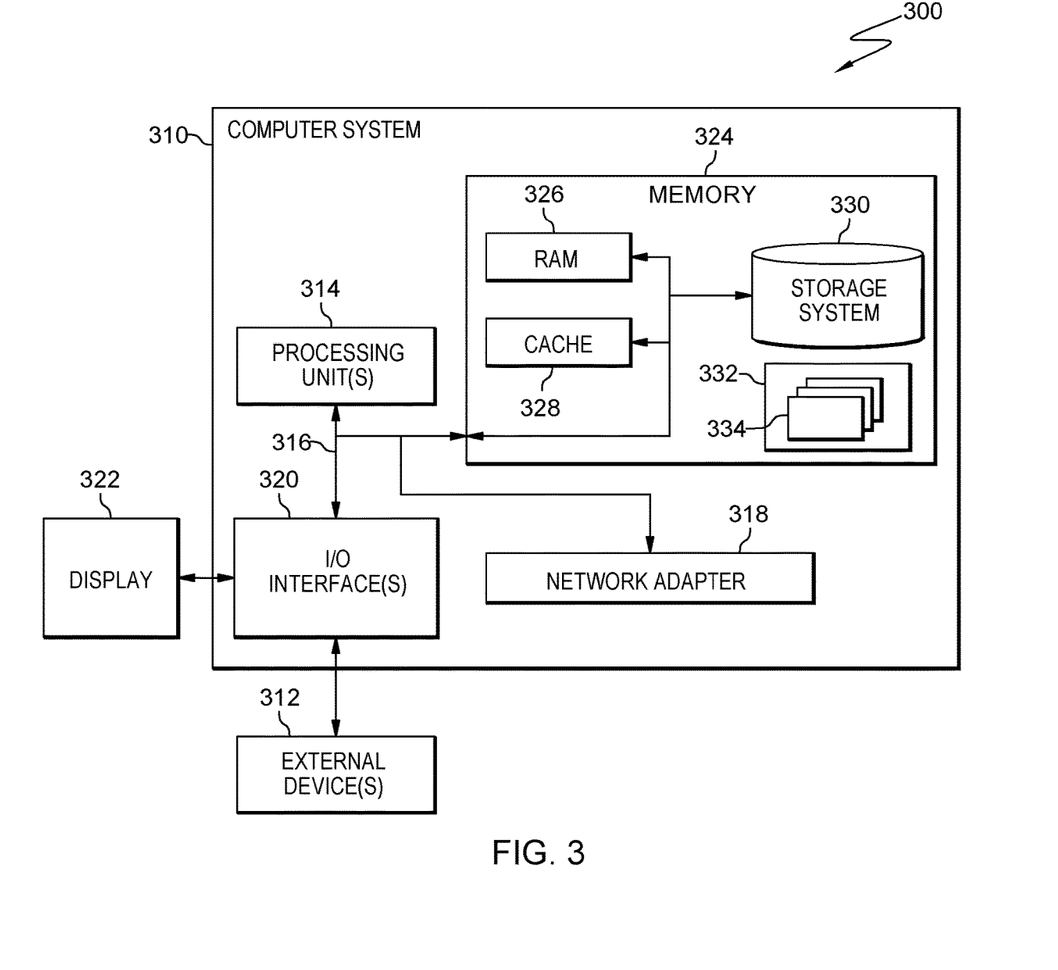
FIG. 3 is a block diagram depicting components of a data processing environment, such as the server of FIG. 1, generally designated 300, in accordance with an embodiment of the present invention.

FIG. 3 is a block diagram depicting components of a data processing environment, such as server 104 of data processing environment 100, generally designated 300, in accordance with an embodiment of the present invention. It should be appreciated that FIG. 3 provides only an illustration of one implementation and does not imply any limitations with regard to the environments in that different embodiments may be implemented. Many modifications to the depicted environment may be made.

In the illustrative embodiment, server 104 in data processing environment 100 is shown in the form of a general-purpose computing device, such as computer system 310. The components of computer system 310 may include, but are not limited to, one or more processors or processing unit(s) 314, memory 324 and bus 316 that couples various system components including memory 324 to processing unit(s) 314.

Bus 316 represents one or more of any of several types of bus structures, including a memory bus or memory controller, a peripheral bus, an accelerated graphics port and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus and Peripheral Component Interconnect (PCI) bus.

Computer system 310 typically includes a variety of computer system readable media. Such media may be any available media that is accessible by computer system 310 and it includes both volatile and non-volatile media, removable and non-removable media.

Memory 324 can include computer system readable media in the form of volatile memory, such as random access memory (RAM) 326 and/or cache memory 328. Computer system 310 may further include other removable/non-removable, volatile/non-volatile computer system storage media. By way of example only, storage system 330 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk") and an optical disk drive for reading from or writing to a removable, non-volatile optical disk, such as a CD-ROM, DVD-ROM or other optical media can be provided. In such instances, each can be connected to bus 316 by one or more data media interfaces. As will be further depicted and described below, memory 324 may include at least one computer program product having a set (e.g., at least one) of program modules that are configured to carry out the functions of embodiments of the invention.

Program/utility 332, having one or more sets of program modules 334, may be stored in memory 324 by way of example and not limitation, as well as an operating system, one or more application programs, other program modules and program data. Each of the operating systems, one or more application programs, other program modules and program data or some combination thereof, may include an implementation of a networking environment. Program modules 334 generally carry out the functions and/or methodologies of embodiments of the invention as described herein. Computer system 310 may also communicate with one or more external device(s) 312, such as a keyboard, a pointing device, a display 322, etc. or one or more devices that enable a user to interact with computer system 310 and any devices (e.g., network card, modem, etc.) that enable computer system 310 to communicate with one or more other computing devices. Such communication can occur via Input/Output (I/O) interface(s) 320. Still yet, computer system 310 can communicate with one or more networks, such as a local area network (LAN), a general wide area network (WAN) and/or a public network (e.g., the Internet) via network adapter 318. As depicted, network adapter 318 communicates with the other components of computer system 310 via bus 316. It should be understood that although not shown, other hardware and software components, such as microcode, device drivers, redundant processing units, external disk drive arrays, RAID systems, tape drives and data archival storage systems may be used in conjunction with computer system 310.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable) or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems) and computer program products according to embodiments of the invention. It will be understood that each block of the flowchart illustrations and/or block diagrams and combinations of blocks in the flowchart illustrations and/or block diagrams, can be implemented by computer readable program instructions.

These computer readable program instructions may be provided to a processor of a general purpose computer, a special purpose computer or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus or other device to cause a series of operational steps to be performed on the computer, other programmable apparatus or other device to produce a computer implemented process, such that the instructions which execute on the computer, other programmable apparatus or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace or to enable others of ordinary skill in the art to understand the embodiments disclosed herein.

The terminology used herein is for the purpose of describing particular embodiments only and is not intended to be limiting of the invention. It should be appreciated that any particular nomenclature herein is used merely for convenience and thus, the invention should not be limited to use solely in any specific function identified and/or implied by such nomenclature. Furthermore, as used herein, the singular forms of "a", "an", and "the" are intended to include the plural forms as well, unless the context clearly indicates otherwise.

What is claimed is:

1. A computer-implemented method for providing a secure communication channel during three-way communications, the method comprising:
    initiating a three-way communication from a user device, the three-way communication being between a user, a third-party interpreter, and a service provider;
    enabling a secured switch in the three-way communication to establish two communication functions for the three-way communication, a passthrough function and a bypass function, the passthrough function providing for communications between the user, the third-party interpreter, and the service provider, the bypass function providing for text-to-speech communications between the user and the service provider including a smart mute function for disabling an audio connection channel of the third-party interpreter in the three-way communication;
    monitoring the three-way communication for typing input from the user device;
    responsive to identifying typing input from the user device, activating the bypass function of the secured switch for text-to-speech communications;
    communicating the typing input directly from the user to the service provider by the text-to-speech communications provided by the bypass function while the audio connection channel connecting the third-party interpreter is disabled; and
    upon completing the text-to-speech communications between the user and the service provider, deactivating the bypass function and reverting back to the passthrough function.

2. The method of claim 1, wherein initiating the three-way communication from the user device, further comprises:
    initiating the three-way communication from the user device to the service provider through the third-party interpreter, wherein the three-way communication includes a video conference communication component supporting bidirectional audio and visual communication between the user and the third-party interpreter, the audio communication component supporting bidirectional audio communication between the third-party interpreter and the service provider, and the alternate audio communication component supporting unidirectional text-to-speech (TTS) audio from the user directly to the service provider.

3. The computer-implemented method of claim 1, wherein
    enabling the secured switch further comprises:
    enabling a video conference communication component supporting bidirectional audio and visual communication between the user and the third-party interpreter, and the audio communication component supporting bidirectional audio communication between the third-party interpreter and the service provider.

4. The computer-implemented method of claim 1, wherein identifying the typing input from the user device includes:
    detecting the typing input from open-air digital handwriting utilizing ocular character recognition (OCR).

5. The computer-implemented method of claim 1, wherein activating the bypass function of the secured switch further comprises:
    enabling unidirectional text-to-speech audio communication from the user directly to the service provider utilizing a text-to-speech generator for converting the typing input to voice data.

6. A computer program product for providing a secure communication channel during three-way communications, the computer program product comprising:
    one or more computer readable storage media and program instructions stored on the one or more computer readable storage media, the stored program instructions, when executed by a processor, causing the processor to perform a method comprising:
        initiating a three-way communication from a user device, the three-way communication being between a user, a third-party interpreter, and a service provider;
        enabling a secured switch in the three-way communication to establish two communication functions for the three-way communication, a passthrough function and a bypass function, the passthrough function providing for communications between the user, the third-party interpreter, and the service provider, the bypass function providing for text-to-speech communications between the user and the service provider including a smart mute function for disabling an audio connection channel of the third-party interpreter in the three-way communication;
        monitoring the three-way communication for typing input from the user device;
        responsive to identifying typing input from the user device, activating the bypass function of the secured switch for text-to-speech communications;

communicating the typing input directly from the user to the service provider by the text-to-speech communications provided by the bypass function while the audio connection channel connecting the third-party interpreter is disabled; and upon completing the text-to-speech communications between the user and the service provider, deactivating the bypass function and reverting back to the passthrough function.

7. The computer program product of claim 6, wherein initiating the three-way communication from the user device further comprises:

initiating the three-way communication from the user device to the service provider through the third-party interpreter, wherein the three-way communication includes a video conference communication component supporting bidirectional audio and visual communication between the user and the third-party interpreter, the audio communication component supporting bidirectional audio communication between the third-party interpreter and the service provider, and the alternate audio communication component supporting unidirectional text-to-speech (TTS) audio from the user directly to the service provider.

8. The computer program product of claim 6, wherein enabling the secured switch further comprises:

enabling a video conference communication component supporting bidirectional audio and visual communication between the user and the third-party interpreter, and the audio communication component supporting bidirectional audio communication between the third-party interpreter and the service provider.

9. The computer program product of claim 6, wherein identifying the typing input from the user device further comprises:

detecting the typing input from open-air digital handwriting utilizing ocular character recognition (OCR).

10. The computer program product of claim 6, wherein activating the bypass function of the secured switch further comprises:

enabling unidirectional text-to-speech (TTS) audio communication from the user directly to the service provider utilizing a text-to-speech generator for converting the typing input to voice data.

11. A computer system for providing a secure communication channel during three-way communications, the computer system comprising:

one or more computer processors;

one or more computer readable storage media; and program instructions stored on at least one of the one or more computer readable storage media, the stored program instructions, when executed by the one or more computer processors, cause the one or more computer processors to perform a method comprising:

initiating a three-way communication from a user device, the three-way communication being between a user, a third-party interpreter, and a service provider;

enabling a secured switch in the three-way communication to establish two communication functions for the three-way communication, a passthrough function and a bypass function, the passthrough function providing for communications between the user, the third-party interpreter, and the service provider, the bypass function providing for text-to-speech communications between the user and the service provider including a smart mute function for disabling an audio connection channel of the third-party interpreter in the three-way communication;

monitoring the three-way communication for typing input from the user device;

responsive to identifying typing input from the user device, activating the bypass function of the secured switch for text-to-speech communications;

communicating the typing input directly from the user to the service provider by the text-to-speech communications provided by the bypass function while the audio connection channel connecting the third-party interpreter is disabled; and upon completing the text-to-speech communications between the user and the service provider, deactivating the bypass function and reverting back to the passthrough function.

12. The computer system of claim 11, wherein initiating the three-way communication from the user device further comprises:

initiating the three-way communication from the user device to the service provider through the third-party interpreter, wherein the three-way communication includes a video conference communication component supporting bidirectional audio and visual communication between the user and the third-party interpreter, the audio communication component supporting bidirectional audio communication between the third-party interpreter and the service provider, and the alternate audio communication component supporting unidirectional text-to-speech (TTS) audio from the user directly to the service provider.

13. The computer system of claim 11, wherein enabling the secured switch further comprises:

enabling a video conference communication component supporting bidirectional audio and visual communication between the user and the third-party interpreter, and the audio communication component supporting bidirectional audio communication between the third-party interpreter and the service provider.

14. The computer system of claim 11, wherein activating the bypass function of the secured switch further comprises:

enabling unidirectional text-to-speech (TTS) audio communication from the user directly to the service provider utilizing a text-to-speech generator for converting the typing input to voice data.

15. The computer system of claim 11, wherein identifying the typing input from the user device further comprises:

detecting the typing input from open-air digital handwriting utilizing ocular character recognition (OCR).

* * * * *